3,181,240
CERAMIC ARTIFICIAL TEETH AND METHOD
OF THEIR MANUFACTURE
Waldemar Kerhart and Heinrich Wienand, Sprendlingen, Germany, and Dieter Weyl, Redwitz, Austria, assignors to Zahnfabrik Wienand Sohne & Company, G.m.b.H., Kreis Offenbach, Germany, a corporation of Germany
No Drawing. Filed June 30, 1961, Ser. No. 137,452
16 Claims. (Cl. 32—8)

This application is a continuation-in-part of pending applications, Serial Nos. 25,217 and 25,218, filed April 28, 1960.

This invention relates to ceramic artificial teeth of a very advantageous nature on the basis of inorganic parent substances and opacifiers, and to a process for the preparation of such teeth.

In the conventional method of preparing ceramic artificial teeth, vitrifiable parent substances, such as feldspar, and opacifiers, such as quartz, kaolin, tin oxide, aluminum oxide or the like, are mixed with one another in appropriate quantity relationships and degrees of distribution and either, with an addition of appropirate assisting agents, formed directly into an unfired tooth which is then fired or the raw substances specified are used to prepare an initial melt, the resultant frit is pulverized and assisting agents are added, and the ceramic teeth are formed from such frit and fired. The latter process is usually preferred since the products it yields are more transparent and therefore more natural-looking.

Special firing processes, such as firing the teeth in vacuo, have also been used to increase the transparency of ceramic teeth and to make them look more like natural teeth. It has therefore been possible to provide a very close resemblance between the transparency of artificial teeth and the transparency of natural teeth, but a great disadvantage of all the conventional products is that they do not have the specific behavior of natural tooth enamel in reflected light and in transmitted light. In the case of very transparent young teeth, the cutting edges have parts which take on a definitely blue tinge in reflected light but which turn yellowish-red in transmitted light. All the endeavors to give ceramic artifical teeth these properties, and therefore to make them resemble natural teeth in this respect, have so far been unsatisfactory.

It has, surprisingly, been found that ceramic artificial teeth prepared from parent substances and opacifiers have the optical phenomenon just described if, in accordance with the invention, at least most of the opacifiers are present in the teeth in a particle size of the order of magnitude of the wavelength of (visible) light; more particularly if most of the particles are present as a highly dispersed system having a particle size of from 1 to 0.4 mu. preferably 0.8 to 0.4 mu. This optical effect produced by the opacifying particles can probably be explained by the physical laws governing light scattering  These laws state that the various wavelengths of visible light are scattered differently by the opacifying particles of the particle sizes specified and that, therefore, the tooth substance takes on different tinges in reflected light and in transmitted light, the more scattered blue light appearing only in reflected light and the less scattered yellowish-red light appearing only in transmitted light.

According to the laws of light scatter, however, this effect depends not only upon the size of the particles causing the scatter but also upon their number per unit of volume of the surrounding substance, and upon the relation between the refractive index of the particles and the refractive index of the surroundings. These laws, although known for many decades, have not previously been applied to tooth ceramics. The glass industry long ago developed opalescent glasses, but most of the production processes concerned in opalescent glasses differ considerably from the production processes used in tooth ceramics; also, the substance systems used in the glass industry are either completely useless for ceramic tooth processes or would lead to completely unsatisfactory products if used in ceramic tooth processes in the light of present development conditions and of present-day requirements as to the quality of ceramic teeth. Clearly, there have been no signposts pointing towards the underlying idea of the invention, since the laws governing the scattering of light have been known for a long time—some of them for almost a century—while the experiences mentioned in connection with the glass industry and technology are also very old, yet engineers in the dental art have not made use either of the laws or of the glass industry experiences in the production of tooth compounds to solve the long-standing problem of producing tooth compounds having the described characteristic optical properties.

Considering further that processes for the preparation of such teeth are of practical use only if they enable the teeth to be produced without any great waste, and considering further the particular requirements made of ceramic teeth, such as high mechanical strength, good flexing and impact strength, satisfactory ability to withstand temperature changes, satisfactory grindability, reduced tendency to splinter, stability of optical effects in the heat treatments conventional in artificial tooth manufacture, it is surprising in what a simple way the invention solves the long-existing problem of preparing, in an industrially feasible manner, ceramic teeth which have the specified special optical behavior of natural teeth and which also meet the aforementioned special requirements made on ceramic teeth.

It also has been found that the aforesaid ceramic artificial teeth which have the properties of natural teeth and which contain opacifiers can be prepared with particular advantage if at least some of the opacifiers are added to the ceramic parent substances in a particle size of the same order of magnitude as the wavelength of light and if the opacifiers are mixed with the parent substances at any time when such admixture is still possible and the resultant compounds are processed further in a conventional manner. As opacifiers, it is possible to use any otherwise suitable mineral material as long as the particles thereof, during the processing and especially during the firing of the teeth, do not either dissolve in the basic ceramic material to an unsatisfactory extent or increase in size substantially in excess of the above-indicated particle size specified; that is, the opacifier particles will substantially maintain their size. In this embodiment of the invention the procedure is, more particularly, such that at least most of the opacifiers are introduced into the ceramic raw compound initially in a particle size of the same order of magnitude as the wavelength of light, whereafter the mixture is shaped or molded, according to conventional practice, and fired, preferably at a reduced pressure.

To carry this aforementioned process into effect, initially reduced feldspar is ground to colloidal fineness in a colloidal mill, and opacifiers are reduced separately to a particle size of the same order of magnitude as the wavelength of (visible) light, preferably to a particle size of about 0.4 to 0.8 mu., whereupon these two starting substances are mixed with additional conventional additives, such as referred to above, to prepare a ceramic raw compound, such as a viscous dough, which is molded into teeth by conventional procedure and fired, preferably at a reduced pressure. In this preferred reduced-pressure firing, and in regard to other embodiments of the invention which will be described hereinafter, the pressure reduction need not be maintained for the duration of firing and can be discontinued at the beginning of the glaze-firing period; once the pressure reduction has been discontinued, the article being fired can be subjected to a pressure above atmospheric.

It has also been found that the aforesaid ceramic artificial teeth which have the properties of natural teeth and which include opacifiers, in accordance with the invention, can be prepared using a method such that at least some of the opacifiers are formed into particles of a size of the same order of magnitude as the wavelength of light, inside the tooth structure by cooling, tempering and/or annealing. Suitable opacifiers which can be used under such circumstances, depending upon the chemical composition and the phase diagram of the ceramic system, are practically all the components of the entire ceramic material system; for instance, $SiO_2$, $Al_2O_3$, $ZrO_2$, or combinations of these components and derivatives; for instance, aluminum or zirconium silicates, provided that such substances are used in the particle form and size specified.

In another possible method of carrying the invention into effect, the firing temperatures are such as will lead to the formation of a saturated solution of the opacifiers in the parent substance. According to the particular application required, the nature and quantity of the starting substances should be so adapted to one another and so selected as to lead to a saturated solution such that particles of a size of the same order of magnitude as the wavelength of light precipiate out of the last-mentioned solution and have the aforementioned optical effect in the final product.

In such an embodiment of the invention, raw mixtures are used in which all or some of the opacifiers are present in a particle size greater than the wavelength of light, since such particles disappear during the dissolving or melting process, unless there is only a reduction to the required particle size, whereafter particles of the same order of magnitude as the wavelength of light precipitate out during cooling.

According to another embodiment of the invention, a two-stage process involving the preparation of a frit can be used. In this process, a mixture of parent substances and opacifiers of any particle size is first melted to form a solution which is oversaturated, more particularly at temperatures above the conventional temperature of which artificial porcelain teeth are fired, whereafter, upon cooling, the resultant material is fritted by conventional milling and then is molded into teeth which are fired, preferably at a reduced pressure. The temperatures, for example, within the teeth while being fired, are so controlled by cooling, tempering and/or annealing that at least most of the opacifiers precipiate out in a particle size of the same order of magnitude as the wavelength of light.

According to another advantageous method of achieving the crystallization effect just described, an oversaturated preliminary frit consisting of parent substances, for example, of a sodium or potassium-aluminum silicate and opacifiers, for example, zirconium oxide, of any particle size, is first prepared at high temperatures above the melting point of the ceramic materials, whereafter such preliminary frit in finely ground condition is admixed with conventional ceramic materials in small quantities comprising, for example, about 1 to 5% for translucent enamel-layer materials and about 10 to 20% for dentine or body materials. The conventional ceramic materials may be either fritted or unfritted.

One particular advantage of the embodiment just described is that the preliminary frit, which is fired at high temperatures, can be ground and then added in precisely measured quantities to the conventional ceramic material in such a way that the required properties of the end product can be adjusted and controlled intentionally, as desired. This form of the process according to the invention also avoids the possibility that the conventional ceramic carrier material, while being fired at lower temperatures than those used to form the frit, will react with the opacifying fritted material and thereby impair the desired opalescent effect in the final tooth product. The aforesaid preliminary frit, therefore, as it were, can possibly be considered a ceramic opalescent pigment and can be mixed, as such, with other ceramic coloring agents or pigments and thereby impart to them the same opalescent effect.

According to a further particularly advantageous embodiment of the invention, the opacifying materials can be incorporated into the ceramic materials in such a manner that the opacifying materials first are introduced in the form of a corresponding salt solution in a suspension of the ceramic raw materials and then precipitated out between and upon the particles thereof. It thus is possible to introduce the opacifying particles or to precipitate them out in the particle size within the size range of the wavelength of light. It is, however, just as possible to use this process to obtain an intimate blending of basic ceramic substances and opacifying substances, whereby super-concentrates can be prepared at this stage and then, with or without fritting, produce by the aforementioned procedures opacifying particles in the desired size within the tooth structure through cooling, tempering, agitation, and/or radiation.

As a specific example of the foregoing procedure, zirconium nitrate solution is added to an aqueous suspension of finely ground feldspar, and by adding ammonia hydroxide, zirconium hydroxide is precipated on the feldspar particles and the excess liquid then is filtered or otherwise separated from the ceramic material. A subsequent fritting, if desired, with a regrinding, can then be followed by molding and firing, preferably under reduced pressure. Such a process offers the particular advantage that it avoids an extra, expensive, time-consuming, fine milling operation which can so easily lead to undesired contamination and other well known problems connected with handling such finely ground substances, by making it possible in this manner to bring about a precipitation of the opacifying materials, for example as hydroxides, as precipitates in the desired colloidal fineness and for which only very small quantities of zirconium nitrate and ammonium hydroxide are required. Expressed as zirconium oxide, only up to approximately 1% by dry weight is required. In such a precipitation process, the rheological behavior of the suspenison changes immediately, even when only small quantities of the opacifying material solution and the precipitating medium are added, producing an almost plastic material from the "lean" materials which also has advantages in the subsequent molding process.

The above-mentioned optional fritting and subsequent reduction before molding is applicable when it is desired to obtain grain sizes which are usual and more easily manipulable in practice in normal tooth production. By such optional intermediary fritting, the effect of the opalescing opacification is in no way spoiled but, rather, is somewhat improved. This embodiment of the process, according to the invention, which involves a precipitation of the opacifying particles, produces an opalescing opacification in the products which, relative to penetrant light, lies within the reddish range, while the materials manufactured in the high temperature melting processes with lower concentrations of pigment may lie more in the yellow field. By mixing corresponding materials appropriately, it thus is possible to obtain a range of desired shades and intensities lying between the two colors.

Upon cooling the melted materials which are formed from mixtures of basic substances and the additives producing the formation of opacifiers, there occurs, as experiments have shown, in particular when the cooling is temporarily suspended, a crystallizing out of the additives, sometimes upon crystals already present, whereby these crystals, especially when feldspar is used as a ceramic raw or basic material, occur as reaction products of the basic substances with the additives. Thus X-rays and, if the crystals are larger, a polarization microscope can show the existence of corundum, mullite, cristobalite, magnesium-metasilicate, zirconiumsilicate, Lucite and similar substances.

It has further been shown that the process of the formation of the opacifying materials in sizes according to the invention can be carried out commercially, advantageously, if known mineral substances which effect the viscosity of this melt are added to the ceramic raw material for controlling the size formation or growth of the opacifying particles. This ability to control the dimensions of the opacifying materials may be attributed to the fact that the size of the crystals which appear upon cooling is dependent upon the inner friction or viscosity of the melt in the temperature range at which the crystals precipitate. By increasing the viscosity, the tendency to form larger crystals diminishes until finally the movement of material within the melt is so reduced by inner friction that any growth or crystallization is stopped. However, it is possible to re-initiate crystallization by the use of a thermal process involving tempering and annealing but, as experiments have shown, this reactivating process is not easy to control. In this connection, this further development of the process according to the invention allows the inner friction of the enamel to be adjusted initially in such a manner that crystal formation adapted to existing conditions can be produced.

It is possible to determine the temperatures at which the precipitating of crystals occurs by establishing the phase diagrams of the melt of the ceramic raw material, i.e. for the feldspar melt, and of the supplementary materials. Conductivity measurements on the melt at these temperatures give an insight into the mobility of the ions of the melt. This enables an expert to control the growth or formation of particles of desired sizes by the addition of substances commonly used to increase or decrease the degree of viscosity. For example, by adding to the ceramic raw material silicon dioxide in amounts up to 15% by weight, in relation to the weight of the raw material, the viscosity of the melt will be increased, while if it is desired to lower the viscosity of the melt, lithium oxide may be added in amounts up to 6% by weight, approximately, of the raw material. If desired, the lithium oxide can be in the form of any suitable known lithium minerals. In regard to the formation of the described formation of frits, either over-saturated or not, it is possible to add materials influencing viscosity of the type described, either wholly or partially to the material, before fritting or after the frit is formed.

To avoid an excess of $SiO_2$ in the melt and the consequent possibility of cristobalite crystals being formed during cooling, especially when $SiO_2$ is added to the melt to increase the viscosity thereof, and thereby avoid giving rise to causing internal stresses in the cooled mass and reduction of thermal shock resistance, an increased glass formation can be induced by the addition of, for example, small quantities of zinc chloride to the melt. These additions, however, should not exceed 4% by weight, since larger quantities would excessively reduce the conversion point and the stability of the melt.

According to a still further embodiment of the process according to the invention, a compound having an over-concentration of opacifying materials of the desired particle size is prepared and the ceramic material from which the tooth is to be molded is mixed therewith in the proportions which may be required. The over-concentration in this embodiment can be made either by the addition of opacifying materials in a particle size falling within the size range of the wavelength of light directly to the basic ceramic materials or by the formation of the opacifying materials in this grain size by one or another of the procedures described above.

In the preparation of said specified material with an over-concentration of opacifying particles of the desired particle size, either the opacifying particles can be directly added in the desired particle size to the basic material or the opacifying particles can be formed in an over-saturated solution of the opacifying material in the super-concentration of basic material by cooling, tempering or other stimulation. Such materials with a super-concentration of opacifying particles may be prepared particularly advantageously at high temperatures which are above the melting point of the basic ceramic materials. In mixing the basic ceramic tooth material with the super-concentrates, it is possible, by varying the concentration of the super-concentrate in the former, to secure intermediate shadings and various intensities in the artificial teeth thus produced.

In the various processes described above, according to the invention, basic or parent ceramic materials which may be used are feldspar and sodium or potassium aluminum silicates, while suitable opacifying materials are tin oxide, quartz, corundum and/or zirconium oxide. Tooth firing temperatures within the range of approximately 1250° C. to approximately 1350° C. are suitable. These, however, are not to be regarded as restrictive.

The following examples are typical of certain formulations and procedures by which certain of the above-described embodiments of the invention may be carried into practice:

Example 1

Pure feldspar of a colloidal particle size is mixed with 10% by weight of Hirschauer kaolin of a particle or grain size of about 0.4 to 0.8 mu until a completely homogenous distribution has been achieved. This powder is worked up with a starch paste and water into a plastic mass of the normal consistency for ceramic tooth molding and a raw tooth is molded from such mass. The tooth is fired at a pressure of 10 mm. mercury and at a temperature of approximately 1300° C. for about 10 minutes, the negative pressure possibly being interrupted and atmospheric or greater pressure is substituted therefor during about the final 5 minutes of firing. The enamel portion of the artificial tooth thus prepared has a bluish tinge in reflected light and a reddish-yellow tinge in transmitted light.

Example 2

Pure feldspar having a grain size of less than 50 mu is mixed with 0.2% by weight of tin oxide having a particle size of less than 5 mu to form a homogeneous powder. The powder is worked up with a starch paste and water to form a plastic mass of the consistency conventional in ceramic tooth molding and is molded into a tooth. The tooth is fired at a pressure of about 10 mm. mercury and at a temperature of approximately 1350° C., the negative pressure being interrupted and higher pressures are substituted therefor during about the final 5 minutes of the firing. During cooling, some of the dissolved opacifier precipitates out in a particle size of the required range. The enamel portion of the tooth appears bluish in reflected light and reddish-yellow in transmitted light.

Example 3

Pure feldspar of a grain size less than 50 mu is mixed with 8% by weight of pure corundum of a grain size of less than 10 mu to form a homogeneous powder which is melted at a temperature of about 1550° C. and then cooled. The resultant frit is ground by conventional means into a powder having a grain size of less than 50 mu and is molded by conventional procedures into teeth and these are fired under the same pressure conditions as in Example 1 and at a temperature of approximately 1250° C. for 10 minutes. The resultant enamel portion of the tooth has a bluish tinge in reflected light and a reddish-yellow tinge in transmitted light.

*Example 4*

94 parts by weight of a sodium or potassium aluminum silicate, which serve as a parent substance, are mixed with 6 parts by weight of finely ground zirconium oxide, and a frit is prepared from this mixture by melting at high temperatures producing vitrification. After cooling, the resultant frit is ground finely and is added, in quantities of from 1 to 5% by weight, to a conventional ceramic tooth material or mixture of materials which are molded and fired by conventional procedures into teeth.

*Example 5*

A melt of the above-described compositions is heated to temperatures of at least 1500 to 1600° C. to ensure satisfactory homogenization and complete solution of the additives. The mixture is maintained at this temperature for about 2 to 3 hours and then cooled slowly until crystals start to separate out. The mixture is then maintained at this temperature for about 1 to 2 hours, whereafter the melt is chilled, as by quenching. After the melt has thus been cooled, the melt cake is pulverized, molded by conventional means and methods into a raw tooth and then fired, if desired, at a pressure less than atmospheric.

We claim:

1. An artificial tooth formed from porcelain material and containing finely divided opacifying particles of a size not substantially exceeding the wave length of light and having sufficiently different refractive indexes from said material to render at least the exterior surface portion of the tooth capable of reflecting and transmitting light in a manner resembling the opalescence exhibited by natural teeth under similar light conditions.

2. The porcelain artificial tooth according to claim 1 in which said finely divided opacifying particles are dispersed at least in the labial or buccal surface portions and incisal or occlusal surface portions respectively of an anterior tooth or a posterior tooth.

3. The porcelain artificial tooth according to claim 1 in which said tooth has a body portion and an enamel layer exterior of and integral with said body portion at least at the labial or buccal surface and incisal or occlusal areas thereof respectively in anterior and posterior teeth and said opacifying particles being included in at least said enamel layer, whereby said reflection and transmission of light to resemble opalescence of natural teeth will be visible especially at said incisal or occlusal areas of the tooth.

4. A porcelain artificial tooth having a body portion and an enamel layer integral with at least the labial or buccal surfaces and comprising potassium-sodium-aluminum silicate porcelain base material mixed and fused with opacifying material dispersed within said base material, at least some of said opacifying material being in a particle size range not substantially exceeding the wave length of light and in a predetermined range of proportions to the base material not exceeding 5% by weight in the enamel layer and 20% by weight in the body portion to provide said tooth with light refracting properties capable of producing readily visible bluish-white color under incident light and readily visible yellowish-red color under penetrant light.

5. Anterior or posterior porcelain artificial teeth each comprising a body portion and an enamel layer integral with at least the labial or buccal surface and incisal or occlusal area thereof, at least said enamel layer being relatively free from bubbles and formed from base dental porcelain material mixed and fused with a predetermined minor proportion of opacifying material dispersed substantially uniformly within said base material and at least the major part of said opacifying material being of a particle size range at least not substantially exceeding the wave length of light, said opacifying material being dispersed within said base material and said minor proportion thereof being sufficient to provide said tooth with light refracting properties comparable to those of average natural teeth and capable of exhibiting readily visible bluish-white color under incident light and readily visible yellowish-red color under penetrant light.

6. A method of producing ceramic artificial teeth having opalescence and comprising the steps of mixing with ceramic base material and binding agents a minor amount of opacifying material of which at least the major portion is of a particle size less than the wave length of light, molding said mixed material into the desired shape of a raw artificial tooth, firing said molded raw tooth at a temperature suitable to fuse the particles thereof together, and cooling said tooth under conditions which will result in the finished tooth having said opacifying material dispersed therein in sufficient proportion to produce opalescence when light either shines onto or through such tooth.

7. The method according to claim 6 further characterized by said firing temperature being high enough to form a solution of said opacifying material and said opacifying material, upon cooling, precipitating within said tooth in particle sizes not greater than the wave length of light.

8. The method according to claim 6 further characterized by first forming said ceramic base material and opacifying material into a frit and grinding the same to fine powder for mixture with the binding materials to form a mixture suitable to mold a raw tooth therefrom.

9. The method according to claim 8 further characterized by said frit being formed at a temperature substantially higher than that used for firing the molded tooth.

10. The method according to claim 7 further characterized by adding to said material to be mixed a mineral compound compatible with the material and operable to change the viscosity of the raw ceramic material when fused and thereby control the size of the precipitated opacifying particles respectively to decrease or increase the size of such particles.

11. The method according to claim 10 further characterized by adding silicon dioxide in desired amounts to the ceramic base material, not in excess of 15% by weight of said ceramic base material, to increase the viscosity thereof and decrease the size of precipitated particles.

12. The method according to claim 10 further characterized by adding lithium oxide in desired amounts to the ceramic base material, not in excess of 6% by weight of said ceramic base material, to decrease the viscosity thereof and increase the size of the precipitated particles.

13. A method for the manufacture of ceramic artificial teeth having light refracting properties comparable to those of average natural teeth and comprising the steps of thoroughly dispersing within basic dental porcelain material a minor proportion of opacifying materials in particle sizes which at maximum are substantially within the size range of the wave length of light, molding said material into raw artificial teeth of predetermined shape, and firing the same at a temperature to fuse said material without appreciable diminution of the particle size of said opacifying material into teeth possessing the same molded shape as the raw teeth except for usual overall shrinkage.

14. A method according to claim 13 further characterized by additionally including the steps of pregrinding said base material in a colloid mill to produce colloidal fineness thereof and also reducing the opacifying material from an initially larger size to a particle size range not more than that of the length of light waves prior to mixing the same with the basic material.

15. A method according to claim 13 further characterized by initially forming the opacifying materials into a solution of salts thereof, mixing said salt solution into a suspension of the raw base dental porcelain material, precipitating said solution on the particles of said raw base material, and separating the excess liquid from the material prior to molding the material into raw teeth.

16. A method according to claim 13 further characterized by initially adding zirconium nitrate solution to an aqueous suspension of finely milled potassium-sodium-aluminum silicate base material and adding ammonia to react with said zirconium nitrate and precipitate onto said silicate base material insoluble and highly dispersed zirconium hydroxide.

References Cited in the file of this patent
UNITED STATES PATENTS

Re. 22,331    Myerson _____ June 8, 1943

OTHER REFERENCES

Ser. No. 368,390, Czapp (A.P.C.), published July 13, 1943.

RICHARD A. GAUDET, *Primary Examiner.*
ROBERT E. MORGAN, *Examiner.*